(12) United States Patent
Tachibana et al.

(10) Patent No.: US 8,920,916 B2
(45) Date of Patent: Dec. 30, 2014

(54) SLIDING MEMBER AND METHOD OF PRODUCING THE SAME

(75) Inventors: Toshimitsu Tachibana, Osaka (JP);
Katsuki Tsukamoto, Osaka (JP)

(73) Assignee: Nitto Denko Corporation, Osaka (JP)

(*) Notice: Subject to any disclaimer, the term of this patent is extended or adjusted under 35 U.S.C. 154(b) by 106 days.

(21) Appl. No.: 13/520,281

(22) PCT Filed: Nov. 11, 2010

(86) PCT No.: PCT/JP2010/006637
§ 371 (c)(1),
(2), (4) Date: Jul. 2, 2012

(87) PCT Pub. No.: WO2011/083526
PCT Pub. Date: Jul. 14, 2011

(65) Prior Publication Data
US 2013/0011170 A1   Jan. 10, 2013

(30) Foreign Application Priority Data
Jan. 8, 2010 (JP) ................. 2010-002664

(51) Int. Cl.
*B32B 3/26* (2006.01)
*B29C 67/04* (2006.01)
*B29K 23/00* (2006.01)
*G03G 15/16* (2006.01)

(52) U.S. Cl.
CPC ......... *B29C 67/04* (2013.01); *B29K 2023/0683* (2013.01); *B29K 2995/0073* (2013.01); *G03G 15/161* (2013.01); *G03G 15/162* (2013.01)
USPC ........................................ 428/304.4; 521/143

(58) Field of Classification Search
CPC B29C 67/04; B29C 43/00; B29K 2023/0683; B29K 2995/0072; B29K 2995/0073
USPC .......... 399/302, 308; 521/143; 264/653, 662, 264/663; 428/304.4
See application file for complete search history.

(56) References Cited

U.S. PATENT DOCUMENTS 5,697,033 A * 12/1997 Ichikawa et al. ............... 399/310
7,783,238 B2 * 8/2010 Oki et al. ....................... 399/308
(Continued)

FOREIGN PATENT DOCUMENTS

JP   4-007169   2/1992
JP   9-174694   7/1997
(Continued)

OTHER PUBLICATIONS

Machine Translation of JP2006-026981. Original Publication Date Feb. 2, 2006.*
(Continued)

*Primary Examiner* — David Gray
*Assistant Examiner* — Carla Therrien
(74) *Attorney, Agent, or Firm* — Hamre, Schumann, Mueller & Larson, P.C.

(57) ABSTRACT

Provided is a sliding member having excellent adhesion and slidability suitable for use as a transfer pad in an image forming apparatus. A sliding member (10) includes a porous body (1) that is a sintered body of ultrahigh molecular weight polyethylene (UHMWPE) particles and having a surface of the porous body (1) as a sliding surface (5). The sliding surface (5) has a particle occupation ratio of 50% or less, and a surface roughness Ra of 2.0 μm or less. The sliding member (10) can be obtained by heating the porous body obtained by cutting the sintered body of UHMWPE particles to make the sliding surface (5) smoother than before the heating.

8 Claims, 1 Drawing Sheet

(56) References Cited

U.S. PATENT DOCUMENTS

| | | | |
|---|---|---|---|
| 7,851,058 B2* | 12/2010 | Iida et al. | 428/319.3 |
| 8,005,411 B2* | 8/2011 | Nakagawa et al. | 399/303 |
| 8,488,274 B2* | 7/2013 | Iida | 360/134 |
| 2002/0106502 A1* | 8/2002 | Ambroise et al. | 428/308.4 |
| 2004/0201922 A1 | 10/2004 | Iida | |
| 2007/0202298 A1 | 8/2007 | Iida et al. | |
| 2008/0075935 A1* | 3/2008 | Iida et al. | 428/206 |
| 2011/0052872 A1* | 3/2011 | Iida et al. | 428/141 |
| 2011/0135920 A1* | 6/2011 | Tachibana | 428/354 |
| 2011/0236653 A1* | 9/2011 | Hayashi et al. | 428/206 |

FOREIGN PATENT DOCUMENTS

| | | | |
|---|---|---|---|
| JP | 09174694 A * | 7/1997 | B29C 67/04 |
| JP | 10-167379 | 6/1998 | |
| JP | 11-311907 | 11/1999 | |
| JP | 2001-019785 | 1/2001 | |
| JP | 2002-082529 | 3/2002 | |
| JP | 2003-103723 | 4/2003 | |
| JP | 2004-285178 | 10/2004 | |
| JP | 2004-310943 | 11/2004 | |
| JP | 2005-085329 | 3/2005 | |
| JP | 2006026981 A * | 2/2006 | B32B 5/30 |
| JP | 2007-009118 | 1/2007 | |
| JP | 2007-229943 | 9/2007 | |
| JP | 2008-310058 | 12/2008 | |
| JP | 2009-023777 | 2/2009 | |

OTHER PUBLICATIONS

Machine Translation of JP2009-023777. Original Publication Date Feb. 5, 2009.*
Machine Translation of JP09-174694. Original Publication Date Jul. 8, 1997.*
Machine Translation of JP11-311907. Original Publication Date Apr. 28, 1998.*

* cited by examiner

SLIDING MEMBER AND METHOD OF PRODUCING THE SAME

TECHNICAL FIELD

The present invention relates to sliding members, and in particular to a sliding member used in an electrophotographic image forming apparatus.

BACKGROUND ART

With recent technological innovations in various fields including the field of electronics, a variety of requirements for sliding members have emerged. For example, in the field of printing, higher-resolution and higher-speed printing has been required. In order to meet these requirements, the belt transfer method using an intermediate transfer belt is widely used for printing. In an electrophotographic image forming apparatus, an electrostatic latent image is first recorded on a photosensitive member such as a photosensitive drum. Next, toner is caused to adhere to the photosensitive member to form a toner image. Then, the toner image is transferred to an intermediate transfer belt. Finally, the toner image is transferred to paper.

When a toner image on a photosensitive member is transferred to an intermediate transfer belt or the toner image transferred to the intermediate belt is transferred to paper, the toner image must be transferred completely. Various ideas have been proposed to help ensure complete transfer of a toner image. For example, Patent Literature 1 discloses a technique for bringing an intermediate transfer belt into close contact with paper by pressing a transfer pad as a sliding member against the back side of the intermediate transfer belt. This close contact between the intermediate transfer belt and the paper ensures the complete transfer. The surface of this transfer pad is coated with fluororesin to improve the slidability.

Because of its high wear resistance, ultrahigh molecular weight polyethylene has the advantage of being less likely to produce powder fragments even if it is worn. Patent Literature 2 discloses a sliding sheet comprising: a porous ultrahigh molecular weight polyethylene sheet; and an adhesive layer provided on one side of the sheet. Patent Literature 3 discloses a sliding member using a sintered body of ultrahigh molecular weight polyethylene particles. This sliding member is used by being disposed between a rotating recording medium (for example, an MO) and a support therefor.

CITATION LIST

Patent Literature

Patent Literature 1 JP 11 (1999)-311907 A
Patent Literature 2 JP 04 (1992)-007169 Y
Patent Literature 3 JP 2004-310943 A

SUMMARY OF INVENTION

Technical Problem

A transfer pad coated with fluororesin, as disclosed in Patent Literature 1, has a problem that the coating material or the transfer pad partially comes off when the intermediate transfer belt and the transfer pad rub against each other. The sliding member using a sintered body of ultrahigh molecular weight polyethylene disclosed in Patent Literature 3 has excellent slidability because of its low friction coefficient. However, according to the study by the present inventors, this sliding member is not suitable as a sliding member for use in an image forming apparatus. This is because the surface of the sliding member is too irregular to bring the intermediate transfer belt into close contact with paper.

Solution to Problem

Under these circumstances, it is an object of the present invention to provide a sliding member using a sintered body of ultrahigh molecular weight polyethylene particles and having good adhesion and slidability.

The present invention provides a sliding member including a porous body that is a sintered body of ultrahigh molecular weight polyethylene particles and having a surface of the porous body as a sliding surface. In this sliding member, the surface has a particle occupation ratio of 50% or less. The particle occupation ratio is a ratio of a plane area occupied by the ultrahigh molecular weight polyethylene particles to the total plane area in the porous body at a depth of 20 μm from an outermost surface of the porous body defined as a top of the particles. The surface has a surface roughness Ra of 2.0 μm or less.

Advantageous Effects of Invention

According to the present invention, a sliding member having wear resistance and good adhesion to the contact surface of the mating member and good slidability on that surface can be obtained. When the sliding member of the present invention is used as a transfer pad of an image forming apparatus, complete transfer of images can be achieved.

DESCRIPTION OF EMBODIMENTS

Figure 1:
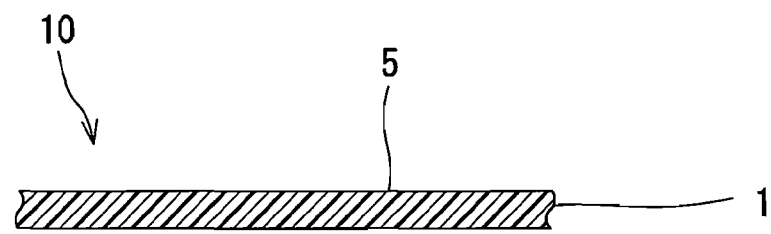
FIG. 1 is a cross-sectional view showing an embodiment of the sliding member of the present invention.

Hereinafter, ultrahigh molecular weight polyethylene is referred to as "UHMWPE".

The sliding member of the present invention includes a porous body that is a sintered body of UHMWPE particles, and the surface of this porous body serves as a sliding surface for sliding on the contact member such as an intermediate transfer belt. This sliding surface has a particle occupation ratio of 50% or less, and a surface roughness Ra of 2.0 μm or less. The particle occupation ratio is the ratio of the area occupied by the particles to the total area near the surface of the sliding member (specifically, a plane in the porous body at a depth of 20 μm from the surface of the sliding member), and can be measured by digitizing the photographic image of the surface. The surface roughness Ra is defined in JIS B0601. When the particle occupation ratio exceeds 50%, the contact area between the sliding member and the contact member (mating member) is too large to obtain good slidability. When the surface roughness Ra of the sliding surface exceeds 2.0 μm, the surface is too irregular to obtain sufficient adhesion to the contact member, although good slidability is obtained.

The particle occupation ratio of the sliding surface is preferably 20% or more and 50% or less, and further preferably 25% or more and 45% or less. The surface roughness Ra of the sliding surface is preferably 1.0 μm or more and 2.0 μm or less, and further preferably 1.0 μm or more and 1.8 μm or less.

In the sliding member of the present invention, it is preferable that the porous body that is a sintered body of UHMWPE particles further contains conductive fine particles such as carbon black in order to decrease the electrostatic charging. Specifically, the surface resistivity of the sliding surface is preferably $1 \times 10^6 \Omega/\square$ or less, and further preferably $1 \times 10^5 \Omega/\square$ or less. When the surface resistivity of the sliding surface is high, electrostatic charge generated by the friction between the sliding member and the intermediate transfer belt cannot be reduced effectively, resulting in an unstable charged state. In the unstable charged state, when the toner image is transferred to the intermediate transfer belt, the toner may scatter, resulting in stains on a printed matter.

In the case where carbon black as conductive fine particles is added to the UHMWPE particles, the content of carbon black is preferably 0.5 parts by mass or more and 10 parts by mass or less per 100 parts of UHMWPE particles, and further preferably 1 part by mass or more and 5 parts by mass or less. When the content of carbon black is less than 0.5 parts, it is difficult to allow the sliding surface to have a desired surface resistivity. On the other hand, when the content exceeds 10 parts, carbon black is likely to come off the sliding member.

Since the sintered body of UHMWPE particles is a porous body and has a larger surface area than a non-porous body, added carbon black is efficiently retained therein. That is, a combination of a sintered body of UHMWPE particles in the form of a porous body and carbon black in the form of fine particles achieves the features of both of these materials, i.e., the wear resistance, adhesion and slidability derived from UHMWPE and the antistatic property derived from carbon black.

In order to reduce the electrostatic charge on the sliding member, a surfactant may be present on the sliding surface of the sliding member in addition to the addition of conductive fine particles to the UHMWPE particles or instead of the addition of conductive fine particles to the UHMWPE particles.

FIG. 1 is a cross-sectional view showing one example of the sliding member of the present invention. A sliding member 10 is made of a single porous UHMWPE sheet 1, and the surface of this sheet 1 serves as a sliding surface 5. The sliding member 10 of the present invention may be a laminate of two or more porous UHMWPE sheets.

The thickness of the sliding member 10 (the porous UHMWPE sheet 1) is preferably 0.1 mm or more and 3.0 mm or less, and further preferably 0.15 mm or more and 2.0 mm or less. When the sheet is too thin, the stiffness (elasticity) of the sheet may become too low to have adhesion to the mating member. On the other hand, when the sheet is too thick, the stiffness of the sheet may become too high to have adhesion to the mating member because the sheet cannot be deformed to conform to the shape of the mating member.

Figure 2:
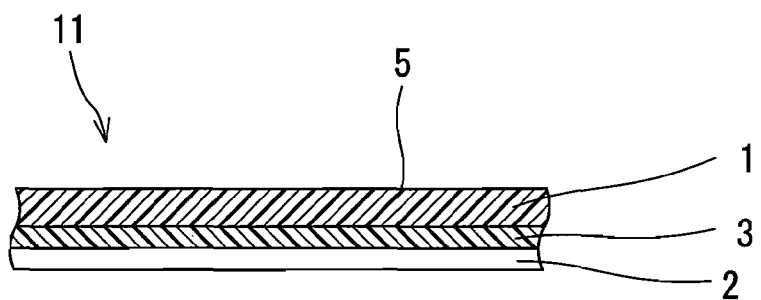
FIG. 2 is a cross-sectional view showing another embodiment of the sliding member of the present invention.

FIG. 2 is a cross-sectional view showing another example of the sliding member of the present invention. A sliding member 11 is a laminate in which a porous UHMWPE sheet 1, a barrier layer 3, and an adhesive layer 2 are laminated in this order, and the surface of the porous UHMWPE sheet 1, which is the outermost layer of this laminate, serves as a sliding surface 5. The adhesive layer 2 is responsible for fixing the sliding member 11 onto another member. The barrier layer 3 prevents the adhesive of the adhesive layer 2 from exuding to the sliding surface 5 through the pores of the porous sheet 1 during long-term use. The adhesive layer 2 can be formed using various adhesives such as acrylic and silicone pressure sensitive adhesives. Various resin sheets can be used for the barrier layer 3, but it is suitable to use a resin sheet made of thermoplastic resin having a melt viscosity of 5 to 500 kPa·S, in particular, a crosslinked polyethylene, as described in Patent Literature 3. The porous sheet 1 and the barrier layer 3 may be joined together by thermal fusion, for example. In an application where there is no need to prevent the exudation of the adhesive, the adhesive layer 2 may be laminated directly on the porous UHMWPE sheet 1.

As shown in FIG. 2, the sliding member may further include other layers and members as long as the porous UHMWPE sheet is disposed as the outermost layer.

One of the means for adjusting the particle occupation ratio and the surface roughness Ra of the sliding surface simultaneously is to select the appropriate particle size of UHMWPE particles used for the production of a sintered body. However, mass-produced UHMWPE particles are limited in size. In addition, the surface of the just sintered UHMWPE particles tends to be too irregular, which tends to lead to insufficient adhesion. Under these circumstances, in order to adjust both the particle occupation ratio and the surface roughness Ra within desired ranges, it is preferable to perform a step of cutting the sintered body of UHMWPE particles to obtain a sheet-like body and further to perform a step of heating the sheet-like body to make the surface thereof smoother.

Based on the above viewpoints, from another aspect, the present invention provides the following production method as a method suitable for producing the sliding member of the present invention. That is, the method of producing a sliding member of the present invention is a method of producing a sliding member including a porous body that is a sintered body of UHMWPE particles and having a surface of the porous body as a sliding surface. This method includes: a first step of sintering UHMWPE particles to obtain a sintered body of the UHMWPE particles; a second step of cutting the sintered body to form a surface serving as the sliding surface and to obtain a porous body having the surface; and a third step of heating the porous body to make the surface of the porous body serving as the sliding surface smoother than before the heating.

Preferably, the porous body obtained in the above second step has a particle occupation ratio of 50% or less as defined above. However, the surface roughness Ra of such a porous body often exceeds 2.0 μm. In this case, the surface roughness Ra is reduced to 2.0 μm or less by the above third step. Normally, the smoothing in the third step increases the particle occupation ratio. Therefore, it is preferable to perform the third step under the conditions where the surface roughness Ra is reduced to 2.0 μm or less while the particle occupation ratio is maintained at 50% or less. The suitable heating temperature in the third step is 110° C. or higher and 160° C. or lower, and the suitable pressure applied to the sheet-like body is 0.05 MPa or more and 0.8 MPa or less.

After the surface of the porous body is smoothed, the surface roughness Ra of the surface becomes lower than before the smoothing, which makes it easier to obtain a porous body with excellent adhesion. In the present description, "smoothing" is used specifically as a term meaning a reduction in the value of the surface roughness Ra.

It is preferable to sinter the UHMWPE particles by steam sintering in the above first step. Steam sintering can be performed by placing UHMWPE particles to be sintered in a chamber, evacuating the chamber, and then sintering the particles together while introducing steam into the chamber. When steam sintering is performed, a large body having a uniform porous structure can be easily obtained, and a sheet with an arbitrary thickness can be obtained with high accuracy by cutting the obtained large body.

In the above second step, the sintered body is cut to form a surface as the sliding surface. When this surface should be significantly smoothed, in the above third step, the surface of the porous body may be heated in contact with the surface of a member such as a metal plate (hereinafter referred to as a "smoothing member"), preferably with pressure applied to the surface of the porous body to press it against the plate. Preferably, the smoothing member is a member having, as a surface to be contacted with the porous body, a smoother surface than that of the porous body to be contacted therewith and made of a material having a higher melting point than the heating temperature of the porous body. Specifically, 1) a metal plate such as an aluminum plate or a stainless steel plate, or 2) a resin plate made of a resin (for example, such as polyethylene terephthalate (PET) or polyimide (PI)) having a higher melting point than UHMWPE are suitable. That is, it is preferable that the surface of the porous body serving as the sliding surface be smoothed while being heated in contact with the surface of a metal plate or a resin plate.

As the smoothing member, a sheet-like body (porous body) of UHMWPE can also be used. Specifically, the third step can be performed by heating the porous laminate of UHMWPE with pressure applied to the laminate, if necessary. That is, the resin plate to be contacted with the surface of the porous body may be a resin plate made of UHMWPE.

The UHMWPE particles have an average particle size of 100 μm or more and 160 μm or less. In the present description, as the average particle size, a value measured by laser diffraction is used.

It is preferable to use, as the above mold, a mold of a metal such as stainless steel or aluminum to increase the thermal conductivity during sintering. In addition, it is preferable to smooth the inner surface of the mold by mirror finishing or the like.

EXAMPLES

Example 1

3 parts by mass of carbon black (Vulcan XC72R manufactured by Cabot Corporation) powder was mixed with stirring with 100 parts by mass of UHMWPE particles (with an average particle size of 130 μm) to obtain a black-colored powder. This black powder was charged into a mold having an outer diameter of 500 mm and a height of 600 mm. This mold was placed in a pressure-resistant metal chamber and the chamber was evacuated to 1000 Pa. Then, the mold was heated at 165° C. for 6 hours, with heated steam introduced into the chamber. Then, the chamber was cooled slowly to obtain a cylindrical sintered body. This sintered body was cut on a lathe set at a thickness of 0.21 mm to obtain a sheet-like body, which is a porous body. The thickness of the sheet-like body was 0.21 mm. Next, the sheet-like body was cut into pieces of 200 mm×200 mm. Ten sheets thus obtained were stacked on top of each other to obtain a stack of sheets. The stack was heated at 120° C. for 120 minutes with a pressure of 2.5 kgf/cm² applied to the stack. After the heating, one sheet was drawn from the stack of sheets except two outermost sheets. Thus, a sliding member composed of a porous UHMWPE sheet with a thickness of 0.2 mm was obtained.

Example 2

Two unheated sheet-like bodies obtained in the same manner as in Example 1 were stacked on an aluminum plate of 200 mm×200 mm with a thickness of 1 mm. An aluminum plate of the same size was placed on the stack and further two sheet-like bodies were stacked thereon. The same procedure was repeated to obtain a stack of ten sheet-like bodies and six aluminum plates, two of which were the top and bottom layers. The stack was heated at 120° C. for 120 minutes with a pressure of 2.5 kgf/cm² applied to the stack. After the heating, one sheet was drawn from the stack of the ten sheets. Thus, a sliding member made of a porous UHMWPE sheet with a thickness of 0.2 mm was obtained. One surface of the obtained sliding member in contact with the aluminum plate was used as a sliding surface for the following evaluation.

Example 3

A sliding member composed of a porous UHMWPE sheet with a thickness of 0.2 mm was obtained in the same manner as in Example 1, except that carbon black powder was not added to UHMWPE particles and that a step of immersing the resulting sintered body of the porous UHMWPE sheet in an aqueous solution of a surfactant and drying the immersed body was added.

Comparative Example 1

A sliding member composed of a porous UHMWPE sheet with a thickness of 0.2 mm was obtained by cutting the cylindrical sintered body obtained in Example 1 on a lathe set at a thickness of 0.2 mm.

Comparative Example 2

A black-colored powder was obtained by adding 15 parts by mass of carbon black powder to 100 parts of the UHMWPE particles of Example 1. 8 g of this black powder was charged in a stainless steel mold with a bottom area of 200 mm×200 mm and a depth of 3 mm. Then, a stainless steel plate of 199 mm×199 mm×1 mm was placed on the mold, and the mold was heated at 180° C. for 15 minutes to obtain a sintered body of UHMWPE particles. A step of applying a pressure of 10 kgf/cm² to this sintered body at 200° C. for 10 minutes was repeated twice. Thus, a non-porous UHMWPE sheet with a thickness of 0.22 mm was formed and used as a sliding member.

Comparative Example 3

One unheated sheet-like body obtained in the same manner as in Example 1 was placed on an aluminum plate of 200 mm×200 mm with a thickness of 1 mm. An aluminum plate of the same size was placed on the stack and further one sheet-like body was stacked thereon. The same procedure was repeated to obtain a stack of ten sheet-like bodies and eleven aluminum plates, two of which were the top and bottom layers. This stack was heated at 130° C. for 240 minutes with a pressure of 10 kgf/cm² applied to the stack. The outermost porous UHMWPE sheet (with a thickness of 0.19 mm) was drawn and used as a sliding member.

Comparative Example 4

A sliding member composed of a porous UHMWPE sheet with a thickness of 0.2 mm was obtained in the same manner as in Comparative Example 1, except that UHMWPE particles (having an average particle size of 160 μm) were used instead of the UHMWPE particles (having an average particle size of 130 μm) of Comparative Example 1 and that the heating while introducing heated steam into the chamber was carried out at 160° C. instead of 165° C. in Comparative Example 1.

The particle occupation ratio, surface roughness, surface resistivity, dynamic friction coefficient, and adhesion of each of the sheets of Examples 1 to 3 and Comparative Examples 1 to 4 were examined in the following manner.

[Particle Occupation Ratio]

First, the image of the surface of each of the obtained sheets was taken by a three-dimensional optical profiler. Then, the obtained image was processed (digitized) with an image analysis software "ImageJ" and "Igor". Next, the particle portions were extracted from the digitized image. Finally, the particle occupation ratio of the surface of the obtained sheet was calculated from the following equation using the area of the extracted particle portions. The area of the extracted particle portions corresponds to the area occupied by the particles at a depth of 20 μm from the surface.

$$\alpha = S1/S0$$

where α is the particle occupation ratio (%) of the obtained sheet, S1 is the area (m$^2$) of the particle portions obtained by the digitization, and S0 is the total area (m$^2$) measured.

[Surface Roughness]

The surface roughness Ra of the surface of each of the obtained sheets was measured according to JIS B0601 using a probe type surface roughness meter ("Surfcom 550A" manufactured by Tokyo Seimitsu). The measurement conditions were a tip diameter of 250 μm, a speed of 0.3 mm/sec and a measured length of 4 mm.

[Surface Resistivity]

The surface resistivity of the surface of each of the obtained sheets was measured in a manner according to JIS K7194 using a Roresta low resistivity meter (model "MCP-T610" manufactured by Mitsubishi Chemical). The measurement was carried out under the conditions of a limiter voltage of 90V, a measurement time of 10 seconds, a measuring probe ASP, and a four-terminal four-probe method.

[Dynamic Friction Coefficient]

Measurement was carried out using a friction tester (Bowden-Leben type friction testing machine "Peeling/Slipping/Scratching TESTER HEIDON-14" manufactured by HEIDON). First, a commercially available polyimide film with a thickness of 25 μm was cut into a piece of 3 mm×20 mm, and the surface of this piece of the polyimide film was bonded to the surface of a steel ball of 10 mm diameter with a double-faced adhesive tape. Next, the obtained sheet was mounted on a table. Then, the iron ball covered with the polyimide film was placed on the obtained sheet mounted on the table. The iron ball covered with the polyimide film was moved back and forth on the obtained sheet with a stroke of 50 mm at a speed of 600 m/min in the direction parallel to the surface of the obtained sheet, with a load of 200 g applied to the obtained sheet, via the iron ball, in the direction perpendicular to the surface of the sheet. The frictional force applied at this time in the direction opposite to the moving direction was measured. Then, the dynamic friction coefficient was calculated from the following equation:

$$\mu = F/N$$

where μ is the dynamic friction coefficient, F is the frictional force (g), and N is the load (g).

[Observation of Adhesion]

An aluminum foil with a thickness of 20 μm was placed on the surface of the obtained sheet, and these foil and sheet were passed between silicone-rubber coated nip rolls rotating at a speed of 2 m/min with a pressure of 1 kgf/cm$^2$ applied thereto. Then, whether or not the irregularities resulting from the surface shape of the sheet were transferred to the aluminum foil was observed visually, and no transfer observed was evaluated as good adhesion, and clear transfer observed was evaluated as poor adhesion.

Table 1 shows the results of the above measurements of the particle occupation ratio, surface roughness Ra, surface resistivity, dynamic friction coefficient, and adhesion of each of the sheets of Examples 1 to 3 and Comparative Examples 1 to 4.

TABLE 1

| | Particle occupation ratio (%) | Surface roughness (μm) | Surface resistivity (Ω/□) | Dynamic friction coefficient | Adhesion |
|---|---|---|---|---|---|
| Example 1 | 28 | 1.5 | $3.3 \times 10^3$ | 0.15 | good |
| Example 2 | 44 | 1.1 | $1.6 \times 10^3$ | 0.20 | good |
| Example 3 | 25 | 1.4 | $1.4 \times 10^9$ | 0.11 | good |
| Comparative Example 1 | 19 | 2.2 | $4.3 \times 10^3$ | 0.17 | poor |
| Comparative Example 2 | 100 | 0.5 | $8.4 \times 10^4$ | 0.31 | good |
| Comparative Example 3 | 68 | 0.9 | $3.9 \times 10^3$ | 0.27 | good |
| Comparative Example 4 | 15 | 2.8 | $6.3 \times 10^3$ | 0.13 | poor |

The dynamic friction coefficient of Comparative Example 2 having a particle occupation ratio of 100% was compared with the dynamic friction coefficients of Examples 1 to 3 each having a porous structure and a particle occupation ratio of 50% or less. As a result, the dynamic friction coefficient of Comparative Example 2 showed a higher value than those of Examples 1 to 3. The dynamic friction coefficient of Comparative Example 3 having a porous structure but having a high particle occupation ratio also showed a higher value than those of Examples 1 to 3. This shows that the sheets of Examples 1 to 3 have good slidability.

Furthermore, the adhesion of Comparative Examples 1 and 4 each having a low particle occupation ratio but having a high surface roughness Ra was compared with that of Examples 1 to 3 each having a surface roughness Ra of 2.0 μm or less by a test as an indicator for evaluating the adhesion. When the sheets of Comparative Examples 1 and 4 were used, the adhesion to the surface of the aluminum foil was inferior to that when the sheets of Examples 1 to 3 were used. This shows that the sheets of Examples 1 to 3 have good adhesion.

Industrial Applicability

The present invention can provide a sliding member having a sliding surface with higher slidability and adhesion than those of conventional sliding members. The sliding member of the present invention is particularly useful as a transfer pad for an image forming apparatus. This transfer pad includes the sliding member of the present invention, and the sliding surface of this sliding member presses one side of a moving intermediate transfer belt to bring the other side of the intermediate transfer belt into contact with an image holding medium (for example, paper) so that a toner image held on the intermediate transfer belt is transferred to the surface of the image holding medium. The sliding member of the present invention can also be used as a blade for removing toner remaining on the intermediate belt without being transferred to paper.

The invention claimed is:

1. A method of producing a sliding member including a porous body that is a sintered body of ultrahigh molecular weight polyethylene particles and having a surface of the porous body as a sliding surface, the method comprising:

a first step of sintering a mixture that comprises conductive fine particles and ultrahigh molecular weight polyethylene particles to obtain the sintered body of the ultrahigh molecular weight polyethylene particles that comprises the conductive fine particles;

a second step of cutting the sintered body to form a surface serving as the sliding surface and to obtain a porous body having the surface; and a third step of heating the porous body having the surface to make the surface of the porous body serving as the sliding surface smoother than before the heating, wherein the porous body obtained in the second step has a particle occupation ratio of 50% or less, and a surface roughness Ra of the surface of the porous body obtained in the second step exceeds 2.0 μm, the particle occupation ratio being a ratio of a plane area occupied by the ultrahigh molecular weight polyethylene particles to the total plane area in the porous body at a depth of 20 μm from an outermost surface of the porous body defined as a top of the particles, in the third step, the surface of the porous body serving as the sliding surface is smoothed by heating and being in contact with a surface of a metal plate or a resin plate, while the surface of the porous body is pressed against the surface of the plate, and after the third step, the particle occupation ratio is maintained at 50% or less, and the surface has the surface roughness Ra of 2.0 μm or less.

2. The method of producing a sliding member according to claim 1, wherein the ultrahigh molecular weight polyethylene particles are steam-sintered to obtain the sintered body.

3. The method of producing a sliding member according to claim 1, wherein the ultrahigh molecular weight polyethylene particles have an average particle size of 100 μm or more and 160 μm or less.

4. The method of producing a sliding member according to claim 1, wherein the pressure applied to the surface of the porous body is in a range of 0.05 MPa to 0.8 MPa.

5. The method of producing a sliding member according to claim 1, wherein after the third step, the surface has the surface roughness Ra of 1.4 μm or more and 2.0 μm or less.

6. The method of producing a sliding member according to claim 1, wherein in the second step, at least two of the porous bodies each having the surface serving as the sliding surface are obtained by cutting the sintered body, in the third step, a stack including the at least two of the porous bodies is heated so that each of the surfaces of the porous bodies serving as the sliding surface is smoothed, and the method further comprises a fourth step of drawing one of the at least two of the porous bodies from the stack after the third step.

7. A method of producing a sliding member including a porous body that is a sintered body of ultrahigh molecular weight polyethylene particles and having a surface of the porous body as a sliding surface, the method comprising:

a first step of sintering ultrahigh molecular weight polyethylene particles having an average particle size of 100 μm or more and 160 μm or less to obtain the sintered body of the ultrahigh molecular weight polyethylene particles;

a second step of cutting the sintered body to form a surface serving as the sliding surface and to obtain a porous body having the surface; and a third step of heating the porous body having the surface to make the surface of the porous body serving as the sliding surface smoother than before the heating, wherein in the third step, the surface of the porous body serving as the sliding surface is smoothed by heating and being in contact with a surface of a metal plate or a resin plate, while the surface of the porous body is pressed against the plate with a pressure in a range of 0.05 MPa to 0.8 MPa, and after the third step, a particle occupation ratio is maintained at 50% or less, and the surface of the porous body has a surface roughness Ra of 1.4 μm or more and 2.0 μm or less, the particle occupation ratio being a ratio of a plane area occupied by the ultrahigh molecular weight polyethylene particles to the total plane area in the porous body at a depth of 20 μm from an outermost surface of the porous body defined as a top of the particles.

8. The method of producing a sliding member according to claim 7, wherein in the second step, at least two of the porous bodies each having the surface serving as the sliding surface are obtained by cutting the sintered body, in the third step, a stack including the at least two of the porous bodies is heated so that each of the surfaces of the porous bodies serving as the sliding surface is smoothed, and the method further comprises a fourth step of drawing one of the at least two of the porous bodies from the stack after the third step.

* * * * *